(12) United States Patent
Vecerik et al.

(10) Patent No.: US 10,872,294 B2
(45) Date of Patent: Dec. 22, 2020

(54) IMITATION LEARNING USING A GENERATIVE PREDECESSOR NEURAL NETWORK

(71) Applicant: DeepMind Technologies Limited, London (GB)

(72) Inventors: Mel Vecerik, London (GB); Yannick Schroecker, Atlanta, GA (US); Jonathan Karl Scholz, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/585,462

(22) Filed: Sep. 27, 2019

(65) Prior Publication Data

US 2020/0104684 A1 Apr. 2, 2020

Related U.S. Application Data

(63) Continuation of application No. PCT/EP2019/075933, filed on Sep. 25, 2019.

(60) Provisional application No. 62/737,866, filed on Sep. 27, 2018.

(51) Int. Cl.
*G06N 3/04* (2006.01)
*G06F 17/18* (2006.01)
*G06N 3/08* (2006.01)

(52) U.S. Cl.
CPC ........... *G06N 3/0472* (2013.01); *G06F 17/18* (2013.01); *G06N 3/08* (2013.01)

(58) Field of Classification Search
CPC ......... G06N 3/0472; G06N 3/08; G06F 17/18
See application file for complete search history.

(56) References Cited

U.S. PATENT DOCUMENTS

2017/0032245 A1\* 2/2017 Osband .................... G06N 3/08
2020/0086863 A1\* 3/2020 Rosman ................ G06N 7/005

OTHER PUBLICATIONS

Meyer, Notes on policy gradients and the log derivative trick for reinforcement learning, 2016, http://www.1-4-5.net/~dmm/ml/log_derivative_trick.pdf (Year: 2016).*

(Continued)

*Primary Examiner* — Austin Hicks
(74) *Attorney, Agent, or Firm* — Fish & Richardson P.C.

(57) ABSTRACT

Methods, systems, and apparatus, including computer programs encoded on a computer storage medium, for training an action selection policy neural network. In one aspect, a method comprises: obtaining an expert observation; processing the expert observation using a generative neural network system to generate a given observation-given action pair, wherein the generative neural network system has been trained to be more likely to generate a particular observation-particular action pair if performing the particular action in response to the particular observation is more likely to result in the environment later reaching the state characterized by a target observation; processing the given observation using the action selection policy neural network to generate a given action score for the given action; and adjusting the current values of the action selection policy neural network parameters to increase the given action score for the given action.

20 Claims, 5 Drawing Sheets

(56) References Cited

OTHER PUBLICATIONS

Torabi et al, Behavioral Cloning from Observation, May 2018, Proceedings of the 27th International Joint Conference on Artificial Intelligence (IJCAI 2018), Stockholm, Sweden, Jul. 2018 (Year: 2018).*
Akgun et al, "Trajectories and keyframes for kinesthetic teaching: a human-robot interaction perspective" International Conference on Human-Robot Interaction, 2012, 8 pages.
Aytar et al, "Playing hard exploration games by watching YouTube" arXiv, Nov. 2018, 15 pages.
Boularias et al, "Relative entropy inverse reinforcement learning" Proceedings of the Fourteenth International Conference on Artificial Intelligence and Statistics, 2011, 8 pages.
Chernova et al, "Robot learning from human teachers" Synthesis Lectures on Artificial Intelligence and Machine Learning, 2014.
Dinh et al, "Density estimation using Real NVP" arXiv, Feb. 2017, 32 pages.
Edwards et al, "Forward-backward reinforcement learning" arXiv, Mar. 2018, 7 pages.
Finn et al, "Guided cost learning: Deep inverse optimal control via policy optimization" arXiv, May 2016, 13 pages.
Fu et al, "Learning robust rewards with adversarial inverse reinforcement learning" arXiv, Aug. 2018, 15 pages.
Germain et al, "Made: Masked autoencoder for distribution estimation" arXiv, Jun. 2015, 10 pages.
Goodfellow et al, "Generative adversarial nets" arXiv, Jun. 2014, 9 pages.
Goyal et al, "Recall traces: Backtracking models for efficient reinforcement learning" arXiv, Jan. 2019, 19 pages.
Ho et al, "Generative adversarial imitation learning" arXiv, Jun. 2016, 14 pages.
Kingma et al, "Auto-encoding variational bayes" arXiv, May 2014, 14 pages.
Mirza et al, "Conditional generative adversarial nets" arXiv, Nov. 2014, 7 pages.
Morimura et al, "Derivatives of logarithmic stationary distributions for policy gradient reinforcement learning" Neural Computation, 2009, 35 pages.
Ng et al, "Algorithms for inverse reinforcement learning" International Conference on Machine Learning, 2000, 8 pages.
Odena et al, "Conditional image synthesis with auxiliary classifier GANs" arXiv, Jul. 2017, 12 pages.
Oord et al, "Pixel recurrent neural networks," arXiv, Aug. 19, 2016, 11 pages.
Oord et al, "Wavenet: A generative model for raw audio," arXiv, Sep. 19, 2016, 15 pages.
Pan et al, "Organizing experience: a deeper look at replay mechanisms for sample-based planning in continuous state domains" Twenty-Seventh International Joint Conference on Artificial Intelligence, 2018, 7 pages.
Papamakarios et al, "Masked autoagressive flow for density estimation," in NIPS.
Pathak et al, "Zero-shot visual imitation" arXiv, Apr. 2018, 16 pages.
Peng et al, "Deepmimic: Example-guided deep reinforcement learning of physics-based character skills" arXiv, Jul. 2018, 18 pages.
Peng et al, "Efficient learning and planning within the dyna framework" Adaptive Behavior, 1993, 18 pages.
Pomerleau, "Alvinn: An autonomous land vehicle in a neural network" Advances in Neural Information Processing Systems, 1989, 9 pages.
Ross et al, "A reduction of imitation learning and structured prediction to no-regret online learning" arXiv, Mar. 2011, 9 pages.
Ross et al, "Efficient reductions for imitation learning" International Conference on Artificial Intelligence and Statistics, 2010, 3 pages.
Schroecker et al, "Directing policy search with interactively taught via-points," ACM Digital Library, 8 pages.
Schroecker et al, "State aware imitation learning," NIPS, 10 pages.
Sermanet, "Time-contrastive networks: self-supervised learning from video," arXiv, Mar. 20, 2018, 15 pages.
Sutton et al, "Policy Gradient Methods for Reinforcement Learning with Function Approximation," NIPS, 7 pages.
Tsitsiklis et al, "Analysis of temporal-difference learning with function approximation," NIPS, 7 pages.
Vecerik et al, "Leveraging demonstrations for deep reinforcement learning on robotics problems with sparse rewards," arXiv, Oct. 8, 2018, 10 pages.
Zhu et al, "Reinforcement and imitation learning for diverse viuomotor skills," arXiv, May 27, 2018, 12 pages.
Ziebart et al, "Maximum entropy inverse reinforcement learning," 23rd AAAI Conference, 2008, 6 pages.
Baram et al., "End-to-End Differentiable Adversarial Imitation Learning," Proceedings of Machine Learning Research, Aug. 2017, 10 pages.
Harmer et al., "Imitation Learning with Concurrent Actions in 3D Games," 2018 IEEE Conference on Computational Intelligence and Games (CIG), Aug. 2018, 8 pages.
PCT International Search Report and Written Opinion in International Appln. No. PCT/EP2019/075933, dated Jan. 17, 2020, 19 pages.
Wang et al., "Robust Imitation of Diverse Behaviors," https://arxiv.org/abs/1707.02747v1, Jul. 2017, 12 pages.

* cited by examiner

IMITATION LEARNING USING A GENERATIVE PREDECESSOR NEURAL NETWORK

CROSS-REFERENCE TO RELATED APPLICATION

This application is a continuation of International Application No. PCT/EP2019075933, filed Sep. 25, 2019, which claims the benefit under 35 U.S.C. 119 of Provisional Application No. 62/737,866, filed Sep. 27, 2018, both of which are incorporated by reference.

BACKGROUND

This specification relates to processing data using machine learning models, and in particular to generating a control system for controlling an agent which interacts with an environment based on data ("observations") characterizing the state of the environment.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that trains an action selection neural network. The action selection network controls an agent interacting with an environment by selecting actions to be performed by the agent that enable the agent to accomplish a task.

According to a first aspect there is provided a method for training an action selection policy neural network. The action selection policy neural network has a set of action selection policy neural network parameters. The action selection policy neural network is configured to process an observation characterizing a state of an environment in accordance with values of the action selection policy neural network parameters to generate an action selection policy output. The action selection policy output includes a respective action score for each action in a predetermined set of possible actions. The action selection policy output is used to select an action to be performed by an agent interacting with an environment.

The method includes obtaining an expert observation which characterizes a state of the environment that has been classified as being relevant to accomplishing a particular task. The expert observation is processed using a generative neural network system to generate a given observation-given action pair. The given observation-given action pair includes: (i) a given observation characterizing a state of the environment, and (ii) a given action from the predetermined set of possible actions. The generative neural network system is configured to process a target observation to generate an observation-action pair, where the generative neural network system has been trained to be more likely to generate a particular observation-particular action pair if performing the particular action in response to the particular observation is more likely to result in the environment later reaching the state characterized by the target observation. The given observation is processed using the action selection policy neural network in accordance with current values of the action selection policy neural network parameters to generate a given action score for the given action. The current values of the action selection policy neural network parameters are adjusted to increase the given action score for the given action which is generated by the action selection policy neural network by processing the given observation.

In some implementations, the generative neural network system includes a generative autoregressive neural network.

In some implementations, the generative autoregressive neural network is a masked autoregressive flow.

In some implementations, processing the expert observation using the generative neural network system to generate the given observation-given action pair includes: processing the expert observation using a first generative neural network to generate the given observation; and processing the expert observation and the given observation using a second generative neural network to generate the given action.

In some implementations, the method further includes obtaining a trajectory from a replay buffer including a set of trajectories, where the trajectory includes a sequence of observation-action pairs characterizing respective states of the environment while the agent interacts with the environment by performing actions selected in accordance with values of the action selection neural network parameters. A particular observation-particular action pair and a future observation are selected from the trajectory, where the future observation is included in an observation-action pair that is after the particular observation-particular action pair in the trajectory. The future observation is processed using the generative neural network system in accordance with current values of generative neural network system parameters to generate a predicted observation-predicted action pair. A loss is determined based on a difference between: (i) the particular observation-particular action pair, and (ii) the predicted observation-predicted action pair. Current values of generative neural network system parameters are adjusted based on the loss.

In some implementations, the actions of the trajectory were selected in accordance with the current values of the action selection neural network parameters.

In some implementations, selecting: (i) a particular observation-particular action pair and (ii) a future observation from the trajectory, includes: selecting the particular observation-particular action pair; sampling a non-negative integer value n from a probability distribution; and selecting the future observation from an observation-action pair in the trajectory that is after the particular observation-particular action pair in the trajectory and is separated from the particular observation-particular action pair by n intervening observation-action pairs in the trajectory.

In some implementations, the probability distribution is a geometric distribution.

In some implementations, the expert observation is included in an expert trajectory, where an expert trajectory is a sequence of expert observations characterizing respective states of the environment while a given agent interacts with the environment by performing a sequence of expert actions that accomplish the particular task.

In some implementations, the expert trajectory includes an expert action corresponding to each expert observation, and the method further includes: obtaining the expert action corresponding to the obtained expert observation; and adjusting the current values of the action selection policy neural network parameters to increase the particular action score for the expert action which is generated by the action selection policy neural network by processing the expert observation.

In some implementations, adjusting the current values of the action selection policy neural network parameters to increase the particular action score for the expert action which is generated by the action selection policy neural network by processing the expert observation includes: determining a gradient of a logarithm of the particular action score for the expert action with respect to the action selection policy neural network parameters; and adjusting the current values of the action selection policy neural network parameters using the gradient.

In some implementations, adjusting the current values of the action selection policy neural network parameters to increase the given action score for the given action which is generated by the action selection policy neural network by processing the given observation includes: determining a gradient of a logarithm of the given action score for the given action with respect to the action selection policy neural network parameters; and adjusting the current values of the action selection policy neural network parameters using the gradient.

In some implementations, the expert observation characterizes the state of the environment at a time when the agent was controlled to interact with the environment to accomplish the particular task.

According to another aspect there is provided a method of controlling an agent interacting with an environment, where the method includes training an action selection policy neural network by the method of the first aspect, and at each of a multiple of successive times: obtaining an observation characterizing the state of the environment at that time, inputting the observation to the action selection policy neural network to obtain control data from the action selection policy neural network, and transmitting the control data to the agent to cause the agent to perform the action.

In some implementations, the environment is a real world environment and the observation is obtained as the output of one or more sensor devices configured to sense the real-world environment.

According to another aspect there is provided a system including one or more computers and one or more storage devices storing instructions that when executed by the one or more computers cause the one or more computers to perform the operations of the method of the first aspect.

According to another aspect there are provided one or more computer storage media storing instructions that when executed by one or more computers cause the one or more computers to perform the operations of the method of the first aspect.

Particular embodiments of the subject matter described in this specification can be implemented so as to realize one or more of the following advantages.

The system described in this specification trains an action selection network to select actions that enable an agent to perform a task by imitating an "expert", i.e., by using a set of expert demonstrations of the task to train the action selection network to match the behavior of the expert. Errors and deviations from the demonstrated expert behavior tend to occur when the action selection network controls the agent, as small mistakes lead the agent to parts of the observation space that the expert has not explored (i.e., that are not included in the set of expert demonstrations). Therefore, the system described in this specification trains the action selection network to select actions that are likely to cause the environment to transition back to states demonstrated by the expert, thereby reducing the accumulation of errors and enabling the agent to recover from mistakes. The system can train the action selection network to reach an acceptable level of performance over fewer training iterations and using fewer expert observations than some conventional training systems, e.g., that do not train the action selection network to recover from mistakes. This is a significant advantage since for many real-world control problems generating expert observations is expensive and time-consuming. In particular, the system described in this specification may consume fewer computational resources than some conventional training systems. This makes the embodiments particularly suitable for implementation on computer systems having limited processing and/or memory capacity, such as a mobile device or a computer system which is a processor provided within an electro-mechanical device which functions as the agent. It further implies that, for a given number of computer resources and/or expert observations, embodiments are able to provide superior control of the agent compared to those conventional training systems.

Moreover, the system described in this specification can train the action selection network using expert observations without knowledge of the corresponding expert actions performed in response to the expert observations. In a particular example, the system described in this specification may train a robotic agent to accomplish a specific task based on videos depicting the task being accomplished, even if the specific actions performed to accomplish the task are unknown. This makes the system described in this specification more broadly applicable than training systems which require both expert observations and expert actions. In particular, for many tasks, far more "unlabeled" expert demonstrations (i.e., that do not specify the expert actions) may be available than "labeled" expert demonstrations (i.e., that do specify the expert actions). The system described in this specification can train the action selection network to select actions to perform a task even if there are no labeled expert demonstrations of the task available.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a training system for training an action selection neural network that is used to control an agent interacting with an environment to accomplish a task by selecting actions to be performed by the agent. The training system can train the action selection network to perform a task by imitating an "expert", i.e., by using a set expert demonstrations of the task to train the action selection network to match the behavior of the expert as closely as possible. For example, the training system may train the action selection network to select actions in response to observations of the environment that match those performed by an expert in response to the same observations (an "observation" refers to data characterizing the state of the environment). However, errors and deviations from the demonstrated expert behavior tend to occur when the action selection network controls the agent, as small mistakes lead the agent to parts of the observation space that the expert has not explored (i.e., that are not included in the set of expert demonstrations). Therefore, the training system described in this specification trains the action selection network to select actions that are likely to eventually lead the agent to environment states demonstrated by the expert, and thereby reduce the accumulation of errors and enable the agent to recover from mistakes. These features and other features are described in more detail below.

Figure 1:
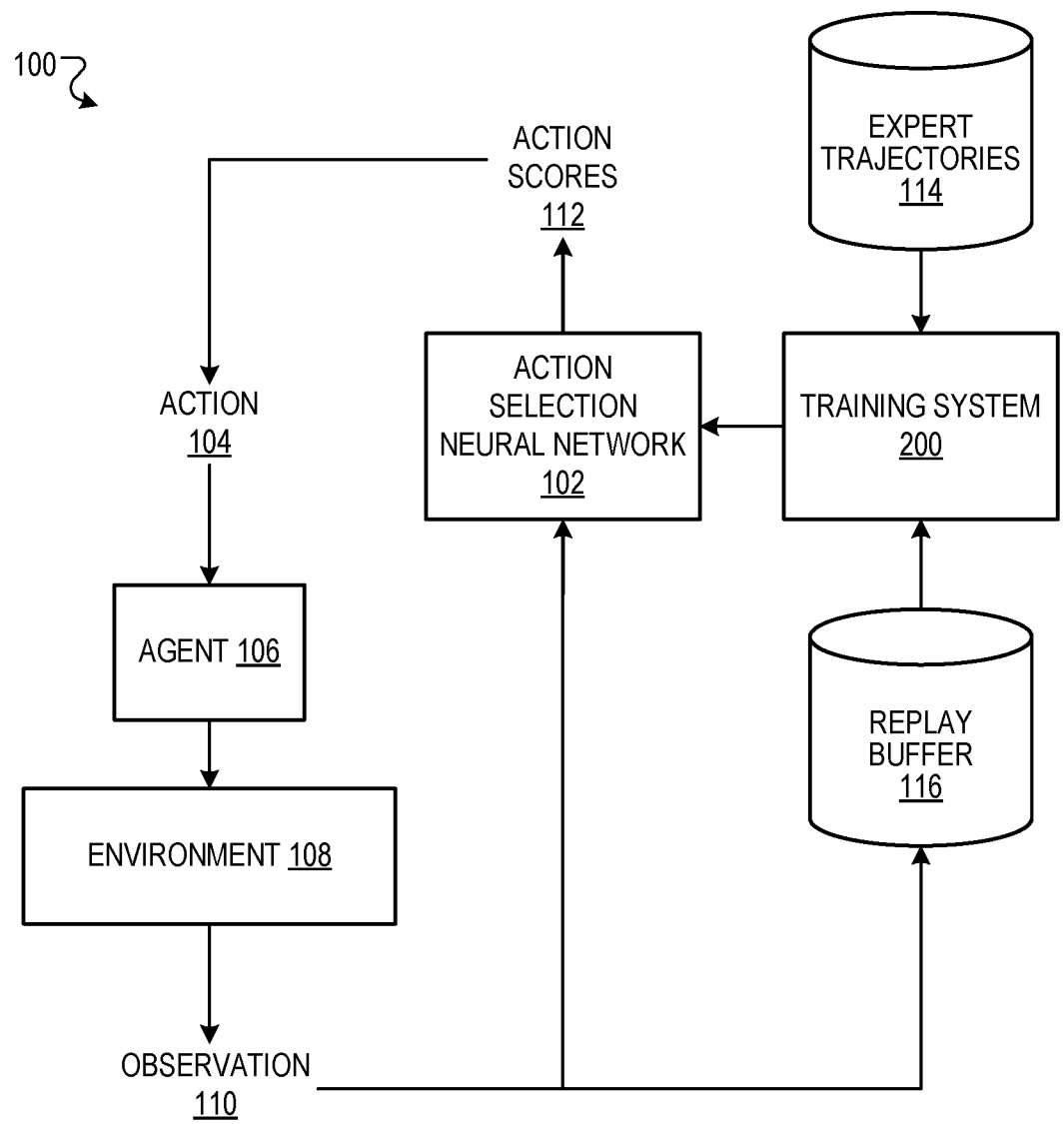
FIG. 1 illustrates an example data flow for using an action selection neural network to select actions to be performed by an agent interacting with an environment at each of multiple time steps to accomplish a task.

FIG. 1 illustrates an example data flow 100 for using an action selection neural network 102 to select actions 104 to be performed by an agent 106 interacting with an environment 108 at each of multiple time steps to accomplish a task. At each time step, the action selection network 102 processes an observation 110 characterizing the current state of the environment 108 to generate action scores 112 that are used to select an action 104 to be performed by the agent 106 in response to the observation. At each time step, the state of the environment 108 (and optionally the agent itself) at the time step (as characterized by the observation 110) depends on the state of the environment 108 at the previous time step and the action 104 performed by the agent 106 at the previous time step.

In some implementations, the environment is a real-world environment and the agent is a mechanical agent interacting with the real-world environment. For example, the agent may be a robot interacting with the environment, e.g., to locate an object of interest in the environment, to move an object of interest to a specified location in the environment, to physically manipulate an object of interest in the environment, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the action selection network may be trained on the simulation. For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

Optionally, in any of the above implementations, the observation at any given time step may include data from a previous time step that may be beneficial in characterizing the environment, e.g., the action performed at the previous time step.

The action scores 112 generated by the action selection network 102 at each time step may include a respective numerical value for each action in a set of possible actions that can be performed by the agent at the time step. The action scores 112 can be used in any of a variety of ways to determine the action 104 to be performed by the agent 106 at a time step. For example, each action score 112 may represent a respective probability value for an action in the set of possible actions. The action 104 to be performed by the agent 106 at the time step can be determined by sampling an action in accordance with the probability values for the actions. As another example, the action with the highest action score 112 may selected as the action to be performed at the time step.

The action selection network 102 can be implemented with any appropriate neural network architecture that enables it to perform its described function. In one example, the action selection network 102 may include an input layer (which receives an observation), followed by one or more convolutional layers, one or more fully-connected layers, and an output layer (which outputs the action scores).

The training system 200 is configured to train the action selection network 102 to accomplish tasks in the environment using: (i) a set of expert trajectories 114, and (ii) a replay buffer 116, which will each be described in more detail next.

Each expert trajectory 114 specifies a sequence of observations (referred to as "expert" observations) characterizing respective states of the environment while an agent interacts with the environment by performing a sequence of actions (referred to as "expert" actions) that accomplish the task. That is, each expert trajectory 114 provides a "demonstration" of how the task can be accomplished. Optionally, the expert trajectories 114 may further specify the expert action corresponding to each expert observation in the expert trajectory. The expert trajectories may be obtained, e.g., by enabling a human to control the agent (or another agent) by selecting actions to be performed by the agent to accomplish the task, and logging the resulting expert observations of the environment. Generally, each expert observation may be understood as characterizing a state of the environment that has been classified as relevant to accomplishing a particular task. For example, each expert observation may characterize a state of the environment at a time when an agent was controlled (e.g. by a human user) to interact with the environment. The time may be one that has been classified as being relevant to accomplishing the task, such as at a time when the agent was controlled (e.g. by a human expert) to perform the task or a related task (e.g. a component of the task or a different task which is related to the task by meeting a similarity criterion with it).

The replay buffer 116 stores a set of agent trajectories, where each agent trajectory specifies a sequence of observations characterizing respective states of the environment while the agent interacts with the environment by performing actions selected by the action selection network 102.

The training system 200 uses the agent trajectories of the replay buffer 116 to train a generative neural network system (also referred to here as a generative predecessor neural network system, and as a generative predecessor system) that is configured to process a "target" observation of the environment to generate a "predecessor" observation-action pair. The predecessor observation-action pair has the property that performing the predecessor action in response to the predecessor observation is likely to cause the environment to subsequently transition (after one or more time steps) to the state characterized by the target observation.

In parallel with training the generative neural network system, the training system 200 uses the expert trajectories 114 to train the action selection network 102 to accomplish the task by imitating expert demonstrations of the task. As part of training the action selection network 102, the training system 200 uses the generative neural network system to process expert observations to generate corresponding predecessor observation-action pairs. The training system 200 then trains the action selection network to increase the action scores generated by the action selection network for the predecessor actions by processing the predecessor observations. (In this context, "increasing" the action score for the predecessor action refers to increasing the likelihood that the predecessor action will be selected in response to the predecessor observation). Through this training, the action selection network 102 learns corrective behavior that enables the agent to recover after deviating from expert behavior in the course of accomplishing the task.

At each time step, the agent 106 may receive a reward based on the current state of the environment 108 and the action 104 of the agent 106 at the time step. In general, the reward is a numerical value. The reward may indicate, e.g., whether the agent has accomplished the task, or the progress of the agent 106 towards accomplishing a task. In addition to training the agent to perform the task by imitating expert demonstrations, the training system 200 may further train the action selection neural network 102 to control the agent to perform actions that maximize a measure of the cumulative reward received by the agent (e.g., the long-term time-discounted sum of rewards). The training system 200 may train the agent to maximize the rewards it receives using any of a variety of reinforcement learning techniques.

Figure 2A:
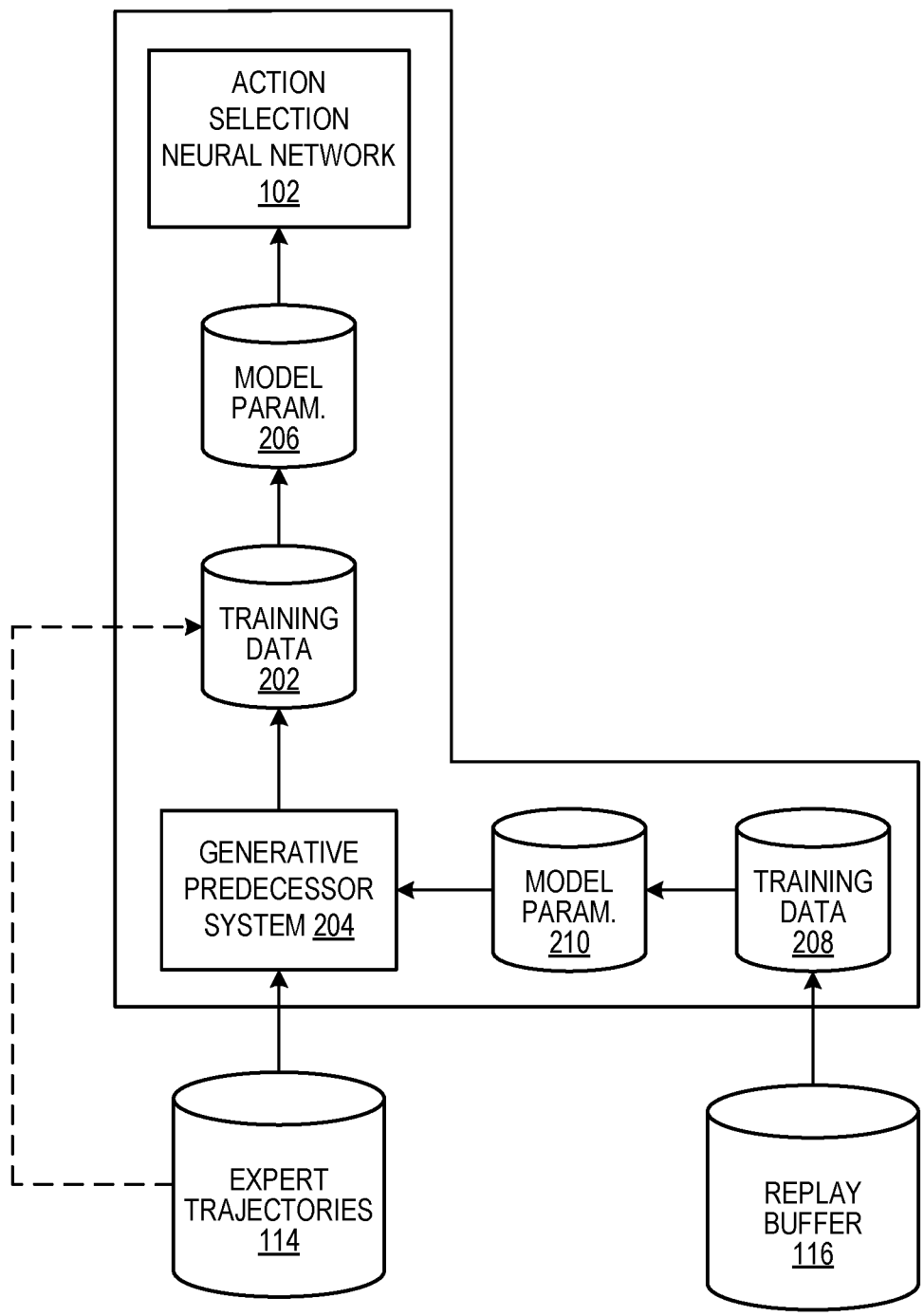
FIG. 2A shows an example training system.

FIG. 2A shows an example training system 200. The training system 200 is an example of a system implemented as computer programs on one or more computers in one or more locations in which the systems, components, and techniques described below are implemented.

The training system 200 is configured to train the action selection network 102 to select actions that enable an agent interacting with an environment to accomplish a task. In particular, the training system 200 generates a set of training data 202 using a generative predecessor system 204, and trains the model parameters 206 of the action selection network 102 on the training data 202, as will be described in more detail next. The training data 202 includes a set of training examples, where each training example specifies: (i) an observation, and (ii) an action that should be selected in response to the observation.

The generative predecessor system 204 is configured to process a target (input) observation to generate a predecessor observation-action pair, such that performing the predecessor action in response to the predecessor observation is likely to cause the environment to subsequently transition to the state characterized by the target observation. To generate a training example for use in training the action selection network 102, the training system 200 obtains (e.g., randomly samples) an expert observation from an expert trajectory 114, and processes the expert observation using the generative predecessor system 204 (i.e. treating the expert observation as a target observation) to generate a corresponding predecessor observation-action pair. The predecessor observation-action pair corresponding to the expert observation thereafter forms a training example, where the predecessor action specifies the action that should be selected in response to the predecessor observation.

In some implementations, the expert trajectories specify the expert actions corresponding to the expert observations (as described earlier), and the training system 200 additionally generates training examples (which may be included in the training data 202) from the expert observations and the expert actions. In particular, the training system 200 generates training examples where the expert action specifies the action that should be selected in response to the corresponding expert observation.

To train the action selection network 102 on the training data 202, the training system 200 selects a "batch" (set) of training examples from the training data 202 and processes the observations specified by the training examples to generate corresponding action scores. Thereafter, for each training example, the training system 200 adjusts the current values of the model parameters 206 to increase the action scores corresponding to the actions specified by the training examples. For example, the training system 200 may adjust the current values of the model parameters 206 of the action selection network 102 using the gradients given by:

$$\sum_{n=0}^{B} \beta_{\pi} \nabla_{\theta} \log \pi_{\theta}(\bar{a}^{(n)} | \bar{s}^{(n)}) + \beta_{d} \nabla_{\theta} \pi_{\theta}(a^{(n)} | s^{(n)}) \quad (1)$$

where B is a non-negative integer value, $\{(\bar{a}^{(n)}|\bar{s}^{(n)})\}_{n=0}^{B}$ are a set of expert observation-action pairs, $\{(a^{(n)}|s^{(n)})\}_{n=0}^{B}$ are a set of predecessor observation-action pairs that are generated by the generative predecessor system 204, $\pi_{\theta}(a|s)$ is the action score generated by the action selection network for action a by processing the observation s, $\nabla_{\theta}$ refers to the gradient with respect to the model parameters θ of the action selection network, and $\beta_{\pi}$ and $\beta_{d}$ are scalar hyper-parameters. In this example, higher values of $\beta_{d}$ encourage the action selection network to learn corrective behaviors to reduce the accumulation of errors, while higher values of $\beta_{\pi}$ encourage the action selection network to directly mimic the expert demonstrations.

The generative predecessor system 204 can generate a predecessor observation-action pair for a target observation in any of a variety of ways. For example, the generative predecessor system 204 may process an input including the target observation using one or more generative neural networks to generate a probability distribution over predecessor observation-action pairs. The generative predecessor system 204 may then sample the predecessor observation-action pair in accordance with the probability distribution.

In some cases, the generative predecessor system 204 may generate a factorized probability distribution over predecessor observation-action pairs. For example, the generative predecessor system may process the target observation using a first generative neural network to generate a probability distribution over predecessor observations, and sample a predecessor observation in accordance with the probability distribution. The generative predecessor system may then process the target observation and the predecessor observation using a second generative neural network to generate a probability distribution over predecessor actions, and sample a predecessor action in accordance with the probability distribution. In one example, the observations may be images, and a probability distribution over predecessor images may specify respective mean and standard deviation parameters of a Normal distribution over pixel intensities corresponding to each pixel of the predecessor image.

The generative neural networks of the generative predecessor system 204 can have any appropriate architecture, e.g., a Masked Autoregressive Flow architecture described with reference to: G. Papamakarios et al., "Masked Autoregressive Flow for Density Estimation", Advances in Neural Information Processing Systems (NeurIPS), (2017). In an autoregressive network the output of the neural network in a certain time period (time) is used as one of the inputs to the neural network at each of one or more successive subsequent time periods. A masked autoregressive flow architecture comprises a stack of autoregressive models, each modelling the random numbers of the next model in the stack.

Generally, updating the action selection policy (i.e., specified by the model parameters 206) may change the likelihood that performing an action in response to an observation (and thereafter selecting actions using the updated action selection policy) will cause the environment to subsequently transition into a target state. Therefore, in addition to training the action selection network 102, the training system 200 trains the generative predecessor system 204 to account for changes in the action selection policy that result from training the action selection network 102.

The training system 200 trains the generative predecessor system 204 on training data 208 that is generated from the agent trajectories of the replay buffer 116. The training data 208 includes a set of training examples, where each training example specifies: (i) a target observation, and (ii) a predecessor observation-action pair that should be generated by the generative predecessor system by processing the target observation.

To generate a training example, the training system 200 may obtain an agent trajectory from the replay buffer 116, and select a target observation and a predecessor observation-action pair from the agent trajectory such that the predecessor observation-action pair precedes the target observation in the trajectory. To encourage the action selection network 102 to learn rapid corrective behavior, the training system 200 may be more likely to select a target observation and a predecessor observation-action pair that are separated by fewer time steps. For example, the training system 200 may select (e.g., randomly sample) the target observation, sample a positive integer value from a geometric probability distribution, and then select the predecessor observation-action pair that precedes the target observation by a number of time steps specified by the sampled integer value. In this example, the geometric probability distribution places more probability mass on lower integer values than on higher integer values, thereby making it more likely that the predecessor observation-action pair will precede the target observation by fewer time steps. Generating a training example for training the generative predecessor system 204 is illustrated with reference to FIG. 2B.

To train the generative predecessor system 204 on the training data 208, the training system 200 selects a batch of training examples from the training data 208 and processes the target observations specified by the training examples using the generative predecessor system 204. The training system 200 then determines a loss based on the outputs of the generative predecessor system 204, determines gradients of the loss with respect to the model parameters 210 of the generative predecessor system 204, and adjusts the values of the model parameters 210 using the gradients. In one example, the generative predecessor system 204 generates a respective probability distribution over predecessor observation-action pairs for each training example, and the training system 200 determines the loss based on the likelihoods of the predecessor observation-action pairs specified by the training examples under the corresponding probability distributions. In this example, the training system 200 may adjust the current values of the model parameters 210 of the generative predecessor system 204 using the gradients given by:

$$\sum_{n=0}^{B} \nabla_\omega \log \mathcal{B}_\omega(s_t^{(n)}, a_t^{(n)} | s_{t+j}^{(n)}) \quad (2)$$

where B is a non-negative integer value, n indexes the training examples, each $\mathcal{B}_\omega(s_t^{(n)}, a_t^{(n)} | s_{t+j}^{(n)})$ is the likelihood of the predecessor observation-action pair specified by training example n under the corresponding probability distribution generated by the generative predecessor system, and $\nabla_\omega$ refers to the gradient with respect to the model parameters co of the generative predecessor system. In another example, the training system 200 determines the loss based on a differences between: (i) predecessor observation-action pairs generated by the generative predecessor system 204 for the training examples, and (ii) the predecessor observation-action pairs specified by the training examples.

The training system 200 may alternate between training the action selection network 102 and the generative predecessor system 204. Prior to each time the generative predecessor system is trained, the training system 200 may generate new agent trajectories where the actions performed by the agent are selected in accordance with the current values of the model parameters 206 of the action selection network 102. The training system 200 may then generate new training data 208 for the generative predecessor system 204 based on the new agent trajectories, thereby enabling the generative predecessor system to adapt to the current action selection policy. Similarly, prior to each time the action selection network 102 is trained, the training system 200 may generate new training data 202 in accordance with the current values of the model parameters 210 of the generative predecessor system 204.

Figure 2B:
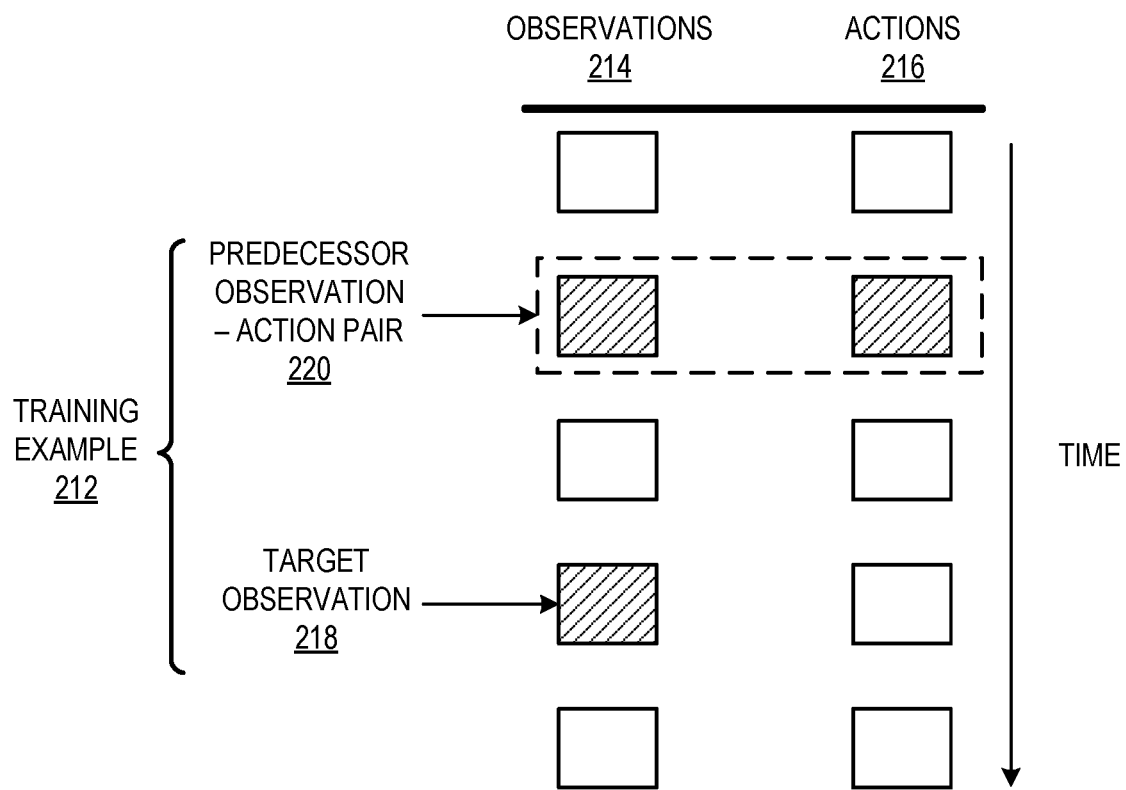
FIG. 2B illustrates an example of generating a training example for training a generative predecessor neural network system from an agent trajectory.

FIG. 2B illustrates an example of generating a training example 212 for training a generative predecessor system from an agent trajectory. The agent trajectory specifies a sequence of observations 214 and a corresponding sequence of actions 216 that were performed by the agent in response to the observations 214. The training example 212 specifies: (i) a target observation 218, and (ii) a predecessor observation-action pair 220 that precedes the target observation 218 in the trajectory. Performing the predecessor action in response to the predecessor observation resulted in the environment subsequently transitioning into the state characterized by the target observation 218. The target observation 218 may be considered a "future observation" in the sense that it is after a particular observation-action pair (i.e. the predecessor observation-action pair 220) in the trajectory.

Figure 3:
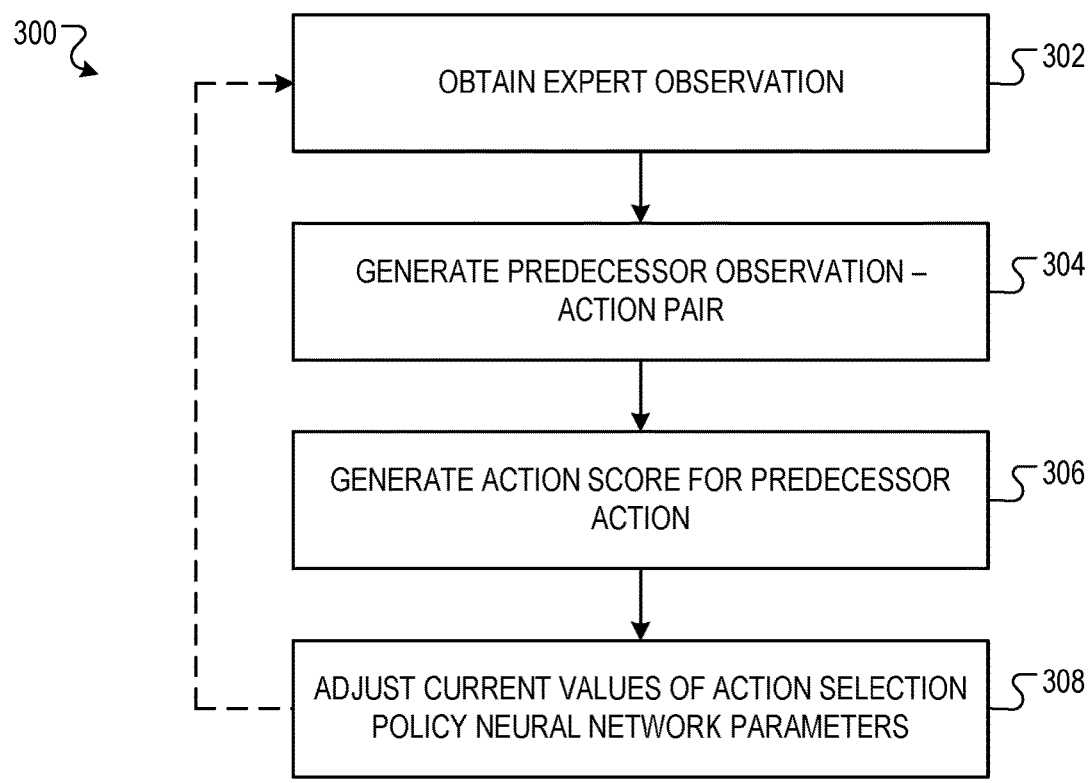
FIG. 3 is a flow diagram of an example process for training an action selection policy neural network.

FIG. 3 is a flow diagram of an example process 300 for training an action selection policy neural network. For convenience, the process 300 will be described as being performed by a system of one or more computers located in one or more locations. For example, a training system, e.g., the training system 200 of FIG. 2A, appropriately programmed in accordance with this specification, can perform the process 300.

The system obtains an expert observation which characterizes a state of the environment that has been classified as being relevant to accomplishing a particular task (302). The expert observation may be included in an expert trajectory, i.e., a sequence of expert observations characterizing respective states of the environment while a given agent interacts with the environment by performing expert actions that accomplish the task.

The system processes the expert observation using a generative neural network system to generate a predecessor observation-action pair (304). The predecessor observation-action pair includes a predecessor observation characterizing a state of the environment and a predecessor action from a predetermined set of possible actions. The generative neural network system is trained to be more likely to generate an observation-action pair if performing the action in response to the observation is more likely to result in the environment later reaching the state characterized by the input observation. An example process for training the generative neural network system is described with reference to FIG. 4.

The generative neural network system may include a generative autoregressive neural network, e.g., a masked autoregressive flow. The generative neural network system may generate the predecessor observation-action pair, e.g., by processing the expert observation using a first generative neural network to generate the predecessor observation, and then processing the expert observation and the predecessor observation using a second generative neural network to generate the predecessor action.

The system processes the predecessor observation using the action selection policy network to generate an action score for the predecessor action (306).

The system adjusts the current values of the action selection network parameters to increase the action score for the predecessor action which is generated by the action selection network by processing the predecessor observation (308). For example, the system may determine a gradient of a logarithm of the action score for the predecessor action with respect to the action selection policy network parameters, and then adjust the current values of the action selection policy network parameters using the gradient. In some cases, the system obtains the expert action corresponding to the expert observation, and further adjusts the current values of the action selection network parameters to increase the action score for the expert action which is generated by the action selection policy network by processing the expert observation. For example, the system may determine a gradient of a logarithm of the action score for the expert action with respect to the action selection network parameters, and adjust the current values of the action selection network parameters using the gradient.

After adjusting the current values of the action selection network parameters, the system may determine whether a training termination criterion is satisfied, e.g., whether a predetermined maximum number of iterations of steps 302-308 have been performed. In response to determining that the training termination criterion is not satisfied, the system may return to step 302.

Figure 4:
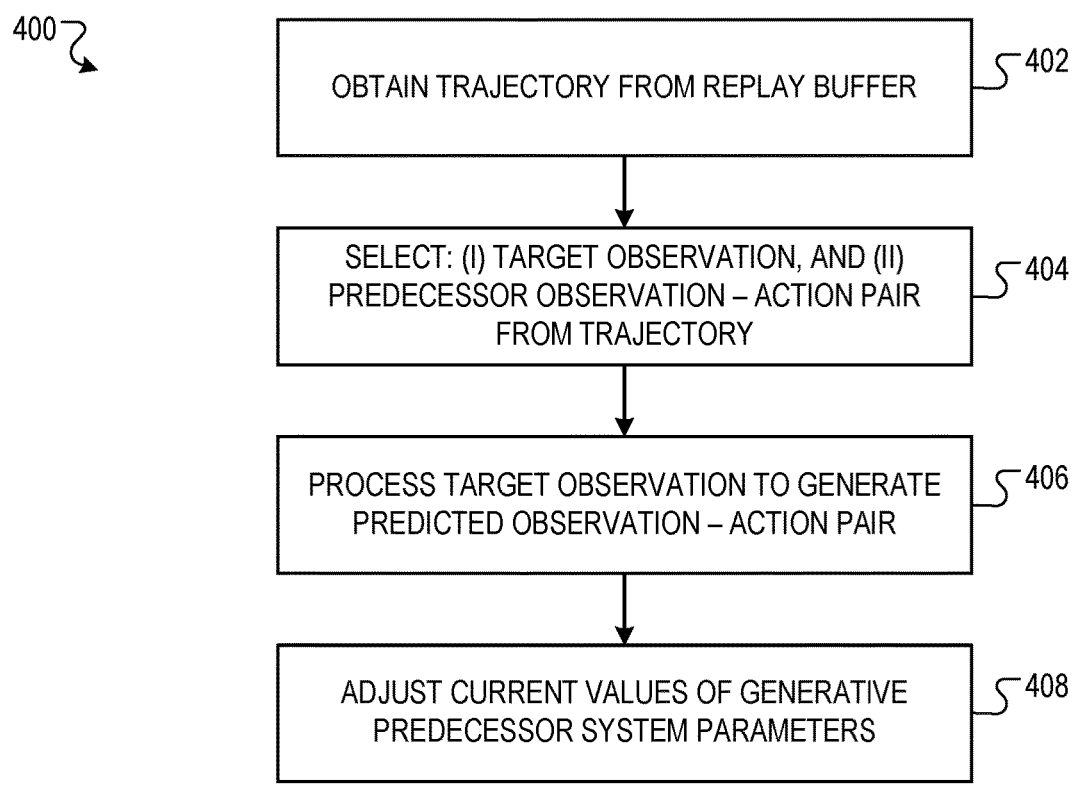
FIG. 4 is a flow diagram of an example process for training a generative predecessor neural network system.

FIG. 4 is a flow diagram of an example process 400 for training a generative predecessor neural network system. For convenience, the process 400 will be described as being performed by a system of one or more computers located in one or more locations. For example, a training system, e.g., the training system 200 of FIG. 2A, appropriately programmed in accordance with this specification, can perform the process 400.

The system obtains a trajectory from a replay buffer (402). The trajectory includes a sequence of observation-action pairs characterizing respective states of the environment while the agent interacts with the environment by performing actions selected in accordance with values of the action selection network parameters (e.g., the current values of the action selection network parameters).

The system selects: (i) a target observation, and (ii) a predecessor observation-action pair from the trajectory, such that the target observation is included in an observation-action pair that is after the predecessor observation-action pair in the trajectory (404). The system may select the predecessor observation-action pair, e.g., by randomly sampling them from the trajectory. The system may then sample a non-negative integer value n from a probability distribution (e.g., a geometric probability distribution), and select the target observation from an observation-action pair in the trajectory that is after the predecessor observation-action pair and is separated from the predecessor observation-action pair by n intervening observation-action pairs.

The system processes the target observation using the generative predecessor system to generate a predicted observation-action pair (406).

The system determines a loss based on a difference between: (i) the predecessor observation-action pair, and (ii) the predicted observation-action pair, and adjusts the current values of the generative predecessor system parameters based on the loss (408). For example, the system may determine a gradient of the loss with respect to the generative predecessor system parameters, and then use the gradient to adjust the current values of the generative predecessor system parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output comprises a respective action score for each action in a predetermined set of possible actions, wherein the action selection policy output is used to select an action to be performed by an agent interacting with an environment, the method comprising:

obtaining an expert observation which characterizes a state of the environment that has been classified as being relevant to accomplishing a particular task;

processing the expert observation using a generative neural network system to generate a predecessor observation—predecessor action pair, wherein the predecessor observation—predecessor action pair comprises: (i) a predecessor observation characterizing a state of the environment, and (ii) a predecessor action from the predetermined set of possible actions, wherein performing the predecessor action in response to the predecessor observation is predicted to cause the environment to subsequently transition into the state characterized by the expert observation after one or more time steps;

processing the predecessor observation using the action selection policy neural network in accordance with current values of the action selection policy neural network parameters to generate an action score for given predecessor action; and adjusting the current values of the action selection policy neural network parameters to increase the action score for the predecessor action which is generated by the action selection policy neural network by processing the predecessor observation.

2. The method of claim 1, wherein the generative neural network system comprises a generative autoregressive neural network.

3. The method of claim 2, wherein the generative autoregressive neural network is a masked autoregressive flow.

4. The method of claim 1, wherein processing the expert observation using the generative neural network system to generate the predecessor observation - predecessor action pair comprises:

processing the expert observation using a first generative neural network to generate the predecessor observation; and processing the expert observation and the predecessor observation using a second generative neural network to generate the predecessor action.

5. The method of claim 1, further comprising:

obtaining a trajectory from a replay buffer comprising a plurality of trajectories, wherein the trajectory comprises a sequence of observation - action pairs characterizing respective states of the environment while the agent interacts with the environment by performing actions selected in accordance with values of the action selection neural network parameters;

selecting: (i) a particular observation - particular action pair and (ii) a future observation from the trajectory, wherein the future observation is included in an observation - action pair that is after the particular observation - particular action pair in the trajectory;

processing the future observation using the generative neural network system in accordance with current values of generative neural network system parameters to generate a predicted observation predicted action pair;

determining a loss based on a difference between: (i) the particular observation - particular action pair, and (ii) the predicted observation - predicted action pair; and adjusting current values of generative neural network system parameters based on the loss.

6. The method of claim 5, wherein the actions of the trajectory were selected in accordance with the current values of the action selection neural network parameters.

7. The method of claim 6, wherein selecting: (i) a particular observation - particular action pair and (ii) a future observation from the trajectory, wherein the future observation is included in an observation - action pair that is after the particular observation - particular action pair in the trajectory comprises:

selecting the particular observation - particular action pair;

sampling a non-negative integer value from a probability distribution;

selecting the future observation from an observation - action pair in the trajectory that is after the particular observation - particular action pair in the trajectory and is separated from the particular observation - particular action pair by intervening observation - action pairs in the trajectory.

8. The method of claim 7, wherein the probability distribution is a geometric distribution.

9. The method of claim 1, wherein the expert observation is included in an expert trajectory, wherein an expert trajectory is a sequence of expert observations characterizing respective states of the environment while a given agent interacts with the environment by performing a sequence of expert actions that accomplish the particular task.

10. The method of claim 9, wherein the expert trajectory comprises an expert action corresponding to each expert observation, and further comprising:

obtaining the expert action corresponding to the obtained expert observation; and adjusting the current values of the action selection policy neural network parameters to increase the particular action score for the expert action which is generated by the action selection policy neural network by processing the expert observation.

11. The method of claim 10, wherein adjusting the current values of the action selection policy neural network parameters to increase the particular action score for the expert action which is generated by the action selection policy neural network by processing the expert observation comprises:

determining a gradient of a logarithm of the particular action score for the expert action with respect to the action selection policy neural network parameters; and adjusting the current values of the action selection policy neural network parameters using the gradient.

12. The method of claim 1, wherein adjusting the current values of the action selection policy neural network parameters to increase the action score for the predecessor action which is generated by the action selection policy neural network by processing the predecessor observation comprises:

determining a gradient of a logarithm of the action score for the predecessor action with respect to the action selection policy neural network parameters; and adjusting the current values of the action selection policy neural network parameters using the gradient.

13. The method of claim 1, wherein the expert observation characterizes the state of the environment at a time when the agent was controlled to interact with the environment to accomplish the particular task.

14. The method of claim 1, wherein the environment is a real-world environment and the expert observation is obtained as an output of one or more sensor devices configured to sense the real-world environment.

15. A system comprising:
one or more computers; and
one or more storage devices communicatively coupled to the one or more computers, wherein the one or more storage devices store instructions that, when executed by the one or more computers, cause the one or more computers to perform operations for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output comprises a respective action score for each action in a predetermined set of possible actions, wherein the action selection policy output is used to select an action to be performed by an agent interacting with an environment, the operations comprising:

obtaining an expert observation which characterizes a state of the environment that has been classified as being relevant to accomplishing a particular task;

processing the expert observation using a generative neural network system to generate a predecessor observation - predecessor action pair, wherein the predecessor observation - predecessor action pair comprises: (i) a predecessor observation characterizing a state of the environment, and (ii) a predecessor action from the predetermined set of possible actions, wherein performing the predecessor action in response to the predecessor observation is predicted to cause the environment to subsequently transition into the state characterized by the expert observation after one or more time steps;

processing the predecessor observation using the action selection policy neural network in accordance with current values of the action selection policy neural network parameters to generate an action score for the predecessor action; and adjusting the current values of the action selection policy neural network parameters to increase the action score for the predecessor action which is generated by the action selection policy neural network by processing the predecessor observation.

16. The system of claim 15, wherein the generative neural network system comprises a generative autoregressive neural network.

17. The system of claim 16, wherein the generative autoregressive neural network is a masked autoregressive flow.

18. The system of claim 15, wherein processing the expert observation using the generative neural network system to generate the predecessor observation - predecessor action pair comprises:

processing the expert observation using a first generative neural network to generate the predecessor observation; and processing the expert observation and the predecessor observation using a second generative neural network to generate the predecessor action.

19. One or more non-transitory computer storage media storing instructions that when executed by one or more computers cause the one or more computers to perform operations for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output comprises a respective action score for each action in a predetermined set of possible actions, wherein the action selection policy output is used to select an action to be performed by an agent interacting with an environment, the operations comprising:

obtaining an expert observation which characterizes a state of the environment that has been classified as being relevant to accomplishing a particular task;

processing the expert observation using a generative neural network system to generate a predecessor observation - predecessor action pair, wherein the predecessor observation - predecessor action pair comprises: (i) a predecessor observation characterizing a state of the environment, and (ii) a predecessor action from the predetermined set of possible actions, wherein performing the predecessor action in response to the predecessor observation is predicted to cause the environment to subsequently transition into the state characterized by the expert observation after one or more time steps;

processing the predecessor observation using the action selection policy neural network in accordance with current values of the action selection policy neural network parameters to generate an action score for the given predecessor action; and adjusting the current values of the action selection policy neural network parameters to increase the action score for the predecessor action which is generated by the action selection policy neural network by processing the predecessor observation.

20. The non-transitory computer storage media of claim 19, wherein the generative neural network system comprises a generative autoregressive neural network.

* * * * *